T. H. McGRATH.
Saddles.
No. 145,001. Patented Nov. 25, 1873.
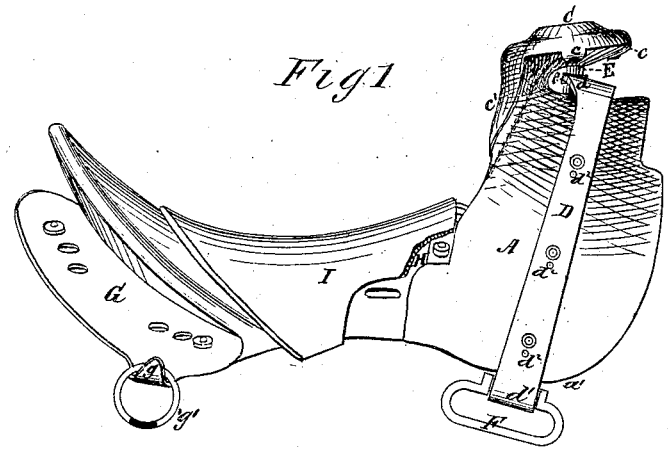
Fig. 1
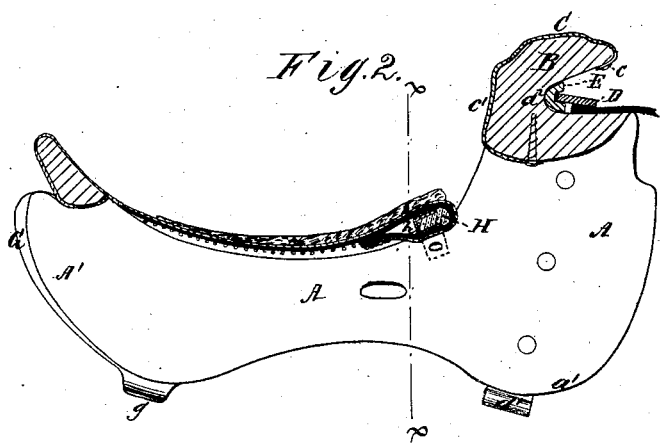
Fig. 2
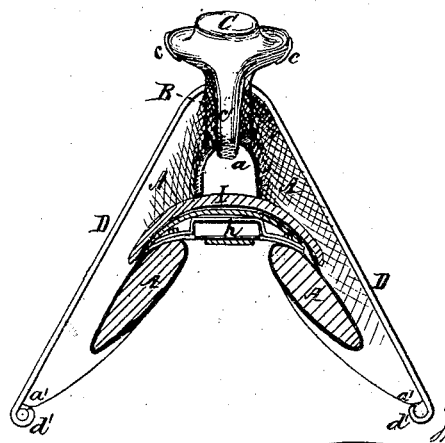
Witnesses.
G. Martin
John O'Kenon
Inventor.
Thos. H. McGrath
Per _____
Attorneys.

UNITED STATES PATENT OFFICE.

THOMAS H. McGRATH, OF SAN ANTONIO, TEXAS.

IMPROVEMENT IN SADDLES.

Specification forming part of Letters Patent No. 145,001, dated November 25, 1873; application filed September 13, 1873.

*To all whom it may concern:*

Be it known that I, THOMAS H. McGRATH, of San Antonio, in the county of Bexar and State of Texas, have invented a new and Improved Saddle; and I do hereby declare that the following is a full, clear, and exact description of the same, reference being had to the accompanying drawing forming a part of this specification, in which—

Figure 1 is a side elevation of the saddle. Fig. 2 is a central longitudinal section. Fig. 3 is a cross-section on line $x\ x$ of Fig. 2.

The invention relates to the construction of saddles, and will be first fully described and then clearly pointed out in the claims.

A represents the saddle-tree made of wood, and B the horn, these being covered by rawhides or other suitable material, or with no cover at all. The horn is braced by the iron cap C, which has flanges $c$ bent beneath it, and a long extension, $c'$, that passes through the hole $a$. D is a forked brace which passes down below the part A on each side of the tree, while it projects inward toward the neck $a^2$, and rests with a concavity, $d$, in the notch $e$ of part-collar E. The iron cap C, with its extension, the fork-brace D, and the part-collar E serve the purpose of re-enforcing and strengthening the front of the saddle against the great strain which it undergoes in lassoing cattle. The fork-brace D is provided at the end with hooks $d^1\ d^1$, in which are swiveled the rings or links F F. $d^2$ are small holes which receive the saddle-nails. G G are plates having the hooks $g\ g$, in which are hung rings $g'\ g'$ that are grooved to allow them to be put on and taken off. They are fastened on the projections A' A' in order to retain the rawhide securely in position. H is the rubber spring, made narrow and placed in a box, $h$, so as not to create a bulge. The box has a light curve on a line with the seat. The "straining," with the holes for the lacing, is made of strong skirting with the stretch all taken out of it, with a gusset cut out in the center, so as to keep it from sinking, and laced up with a strong buckskin string. This is fastened over the spring and attached to the seat. It will retain its shape and form, smoothness, and elasticity in all changes of climate. The shammy or floating seat I is made, preferably, of felt or sheepskin skived down on the edge.

Having thus described my invention, what I claim as new, and desire to secure by Letters Patent, is—

1. The metallic cap C, having flanges $c$ and extension $c'$ applied to horn of saddle-tree, as and for the purpose described.

2. The grooved part-collar E, applied under the front of the horn of a saddle, as and for the purpose set forth.

THOMAS H. McGRATH.

Witnesses:
TIMOTHY McGOWAN,
HORACE GRACE.